Feb. 22, 1927.
J. W. MEADE
1,618,941
CHAIN FASTENER
Filed Sept. 9, 1926
2 Sheets-Sheet 1
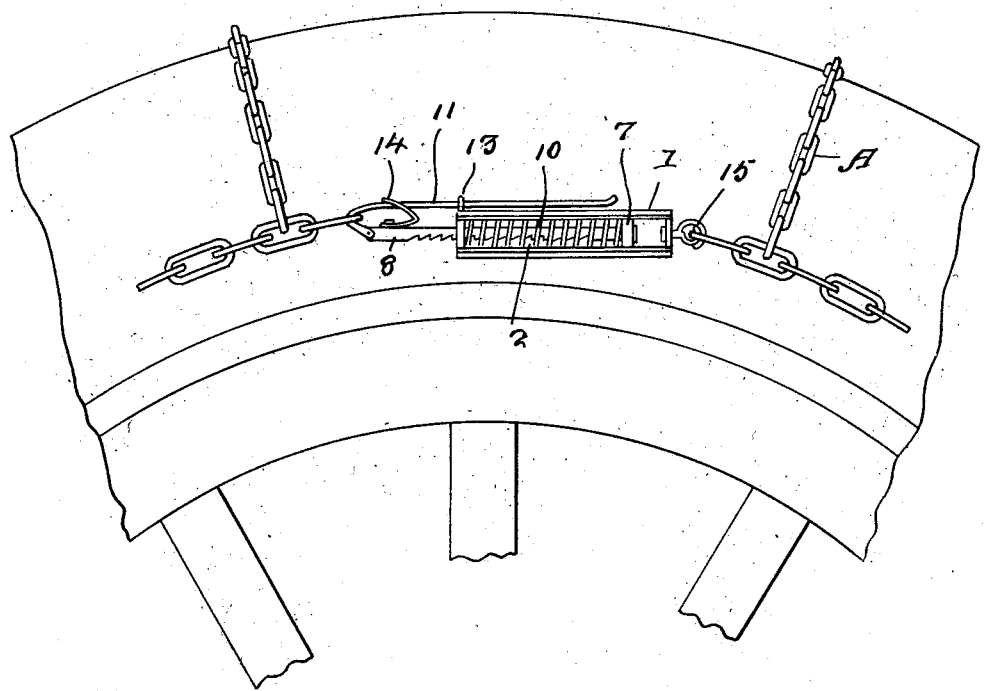
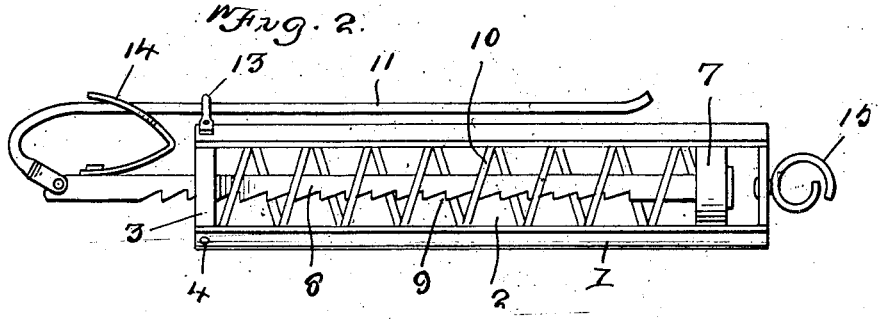
J. W. Meade,
INVENTOR
BY Victor J. Evans
ATTORNEY

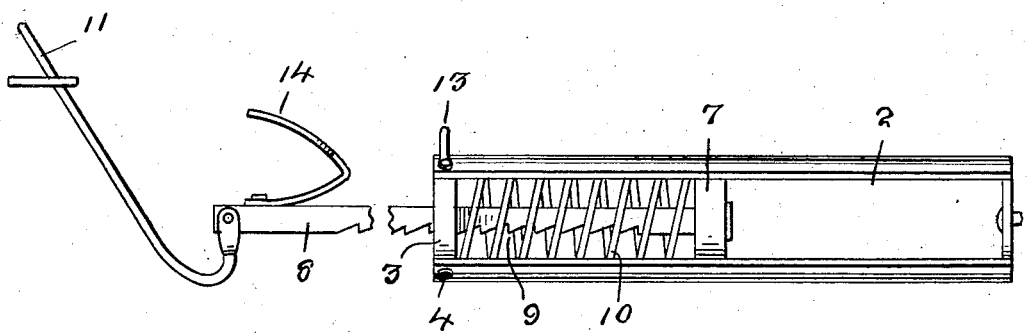
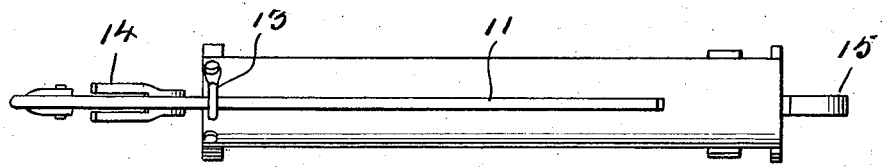
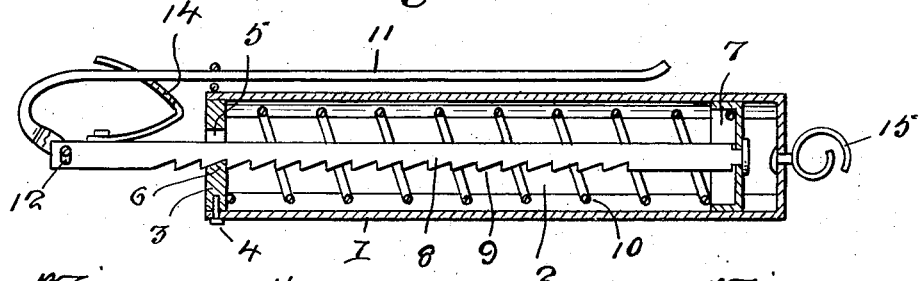
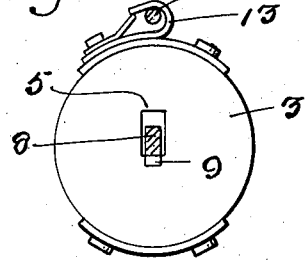
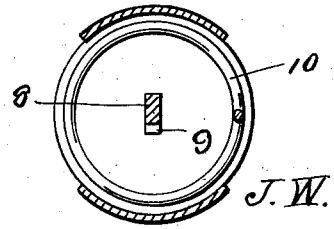

Patented Feb. 22, 1927.

1,618,941

UNITED STATES PATENT OFFICE.

JOHN W. MEADE, OF HELENA, MONTANA.

CHAIN FASTENER.

Application filed September 9, 1926. Serial No. 134,528.

This invention relates to a fastener device which is mainly designed for fastening the ends of anti-skid chains together, though it may be used for other purposes.

The general object of the invention is to provide means for taking up the slack of the chain as well as to hold the ends of the chain together.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a view showing the invention used to hold an anti-skid chain on a tire.

Figure 2 is an elevation of the device itself.

Figure 3 is a similar view but showing the parts in open position.

Figure 4 is a top plan view.

Figure 5 is a longitudinal sectional view.

Figure 6 is a front end view, with parts in section.

Figure 7 is a transverse sectional view.

In these views, 1 indicates a cylinder which is formed with the openings 2 in its sides and said cylinder has one of its end pieces 3 fastened therein by the bolts 4. The other end piece may be formed with the sides. The end piece 3 is provided with an opening 5 which has a portion of its wall beveled to form a tooth 6. A piston 7 is arranged in the cylinder and its rod 8 passes through the opening 5 and has teeth 9 thereon for engaging the tooth 6 to hold the piston in adjusted position in the cylinder. A coiled spring 10 is arranged in the cylinder and tends to hold the piston against the rear end of the cylinder. The teeth are so formed that the spring will move the piston toward the rear end of the cylinder, the teeth 9 sliding over the tooth 6, but movement in an opposite direction will be prevented by the engagement of the teeth, unless the piston rod is moved against the other end of the opening 6 which will move the teeth thereon out of engagement with the tooth 6. Then the parts can be moved outwardly against the action of the spring.

A latch member 11 has its hooked end pivotally and movably connected with the outer end of the rod 8 by means of the pin and slot connection 12, and said latch member is held in latching position by means of a snap hook 13 carried by the cylinder and engaging the member to hold it adjacent the cylinder, as shown in Figures 1, 2 and 5. A forked spring 14 is fastened to the outer end of the rod 8 and has its forked part engaging the member 11, when said member is in closed position and this spring 14 presses the rod 8 against the tooth 6.

A split loop member 15 is swiveled in the rear end of the cylinder.

As shown in Figure 1, the member 15 is placed in engagement with the end link of one of the side chains of the anti-skid device A and the latch member 11 is passed through the opposite end link of the side chain and then the latch member is moved to closed position and placed in engagement with the snap hook 13, which locks it in closed portion. The spring 14 will then press the piston rod against the tooth 6 so that the rod cannot move outwardly but it is permitted to move inwardly under the action of the spring against the piston. Thus slack in the side chain or any other chain or flexible member to which the device is connected, will be automatically taken up by the device.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A device of the class described comprising a cylinder, a piston therein, a piston rod having teeth thereon, one end of the piston having a hole therein through which the rod passes, a part of the wall of the hole being formed with a tooth to engage the teeth of the rod and a latch member fastened to the outer end of the rod.

2. A device of the class described comprising a cylinder, a piston therein, a piston rod having teeth thereon, one end of the piston having a hole therein through which the rod passes, a part of the wall of the hole being formed with a tooth to engage the teeth of the rod, a latch member fastened to the outer end of the rod and means on the cylinder for holding the latch member in closed position.

3. A device of the class described comprising a cylinder, a piston therein, a piston rod having teeth thereon, one end of the piston having a hole therein through which the rod passes, a part of the wall of the hole being formed with a tooth to engage the teeth of the rod, a latch member fastened to the outer end of the rod, means on the cylinder for holding the latch member in closed position and a spring on the rod and engaging the latch member, when the same is in closed position, for holding the toothed part of the rod against the tooth at the end of the cylinder.

4. A device of the class described comprising a cylinder, a piston therein, a piston rod having teeth thereon, one end of the cylinder having a hole therein through which the rod passes, a part of the wall of the hole being formed with a tooth to engage the teeth of the rod, a spring for holding the piston in retracted position and a latch member fastened to the outer end of the rod.

In testimony whereof I affix my signature.

JOHN W. MEADE.